United States Patent [19]

O'Donnell et al.

[11] Patent Number: 5,397,375
[45] Date of Patent: Mar. 14, 1995

[54] PROCESS FOR THE PRODUCTION OF METALLIC TITANIUM AND INTERMEDIATES USEFUL IN THE PROCESSING OF ILMENITE AND RELATED MINERALS

[75] Inventors: Thomas A. O'Donnell, Burwood; John Besida, Yarraville; Tersesa K. H. Pong, Coburg; David G. Wood, St. Kilda, all of Australia

[73] Assignee: The University of Melbourne, Parkville, Australia

[21] Appl. No.: 107,787

[22] PCT Filed: Feb. 21, 1992

[86] PCT No.: PCT/AU92/00062
§ 371 Date: Oct. 22, 1993
§ 102(e) Date: Oct. 22, 1993

[87] PCT Pub. No.: WO92/14851
PCT Pub. Date: Sep. 3, 1992

[30] Foreign Application Priority Data

Feb. 21, 1991 [AU] Australia .............................. PK4721

[51] Int. Cl.$^6$ ................................................ C22B 5/00
[52] U.S. Cl. ........................................ 75/368; 75/617; 75/619
[58] Field of Search ............................ 75/617, 619, 368

[56] References Cited

U.S. PATENT DOCUMENTS

| | | | |
|---|---|---|---|
| 2,647,826 | 8/1953 | Jordan | 75/368 |
| 2,986,462 | 5/1961 | Wright | 75/617 |
| 3,825,415 | 7/1974 | Johnston | 75/619 |
| 3,847,596 | 11/1974 | Holland | 75/619 |

*Primary Examiner*—Peter D. Rosenberg
*Attorney, Agent, or Firm*—Sughrue, Mion, Zinn, Macpeak & Seas

[57] ABSTRACT

The invention relates to a process for the production of metallic titanium, characterized in that the process comprises reducing a titanium-fluorine compound selected from titanium tetrafluoride and any hexafluorotitanate soluble in a molten fluoroaluminate, with metallic aluminum in a molten fluoroaluminate. A process for the production of intermediates useful in the processing ilmenite and related minerals is also described.

7 Claims, No Drawings

PROCESS FOR THE PRODUCTION OF METALLIC TITANIUM AND INTERMEDIATES USEFUL IN THE PROCESSING OF ILMENITE AND RELATED MINERALS

This invention relates to a process for the production of metallic titanium and intermediates useful in the processing of ilmenite and related minerals.

Australia is the major world producer of ilmenite which is exported for about A $75 per tonne. The cost of metallic titanium in ingot form is about A$20,000 per tonne. In a more refined form, for example, as the titaniumbased alloy from which jet engine fan blades are fabricated, the value of metallic titanium is very much greater. Metallic titanium is, by comparison with most other metals and alloys, very resistant to chemical corrosion and is in great demand in the manufacture of chemical plants and for heat-exchangers and other units in power plants. Another important application is the use of metallic titanium in surgical and dental implants and supports. an a strength-for-weight basis, metallic titanium is stronger than steel and is widely used in the construction of supersonic military aircraft. A cheaper manufacturing route to the production of titanium would make feasible its use in civil aircraft to replace aluminium alloys which have proved to be subject to fatigue failure. This is one of the many applications in which the light, strong and non-corrosive metallic titanium would find wide commercial usage, if available more cheaply than from current processes.

Currently, metallic titanium is produced commercially by two closely related processes. Titanium tetrachloride ($TiCl_4$) is reduced by either metallic sodium (Na) or magnesium (Mg). Each process yields an initial material called "titanium sponge" which may contain 10 to 20% of sodium chloride (NaCl) or magnesium chloride ($MgCl_2$) as products of the initial reaction. To avoid inclusion in the sponge of chlorides of titanium in lower oxidation states (e.g. $TiCl_2$ or $TiCl_3$), excess reducing metal (Na or Mg) is also in the sponge. Both methods of production are batch processes and the sponge, on solidification after reaction, must be removed from the reactor manually. It is reported that jack-hammers and even explosives are used. The sponge is then purified at least three times by vacuum arc-melting. The processes are both labour and energy intensive.

We have now found that a flee-flowing powder of metallic titanium can be produced by employing a process which is similar to conventional aluminium smelting.

According to the present invention there is provided a process for the production of metallic titanium, characterized in that the process comprises reducing a titanium-fluorine compound selected from titanium tetrafluoride and any hexafluorotitanate soluble in a molten fluoroaluminate, with metallic aluminium in a molten fluoroaluminate.

The preferred titanium-fluorine compound is an alkali hexafluorotitanate, more preferably, sodium hexafluorotitanate ($Na_2TiF_6$) or potassium hexafluorotitanate ($K_2TiF_6$).

Preferably the molten fluoroaluminate is a hexafluoroaluminate, more preferably, cryolite ($Na_3AlF_6$).

In one particular embodiment of the invention, sodium hexafluorotitanate ($Na_2TiF_6$) or potassium hexafluorotitanate ($K_2TiF_6$) is dissolved in cryolite ($Na_3AlF_6$) at about 1000° to 1100° C. and metallic aluminium (Al) is added. Aluminium is chosen as the reductant because it is compatible with the melt, being oxidized in the first instance to aluminium fluoride ($AlF_3$) and then interacting with sodium fluoride (NaF) to form cryolite ($Na_3AlF_6$). In addition, aluminium is much less energy-intensive and cheaper to produce than sodium or magnesium reductants used in the current processes.

Recovery of metallic titanium is achieved as a consequence of the relative densities of the reactants and the molten medium. Aluminium is less dense than cryolite which, in turn, is less dense than metallic titanium. Therefore, metallic titanium has a tendency to collect at the bottom of the reaction bath and may be tapped from that position with molten cryolite.

The overall reaction for the reduction of $Na_2TiF_6$ by aluminium to metallic titanium in cryolite occurs in accordance with the equation:

$$3Na_2TiF_6 + 4Al + 6NaF \rightarrow 4Na_3AlF_6 + 3Ti$$

The pure compound $Na_3AlF_6$ constitutes a neutral molten medium. If the melt is deficient in NaF, i.e. contains an excess of $AlF_3$, the medium is acidic. If the melt contains an excess of NaF, then the medium is basic.

$Na_2TiF_6$ may be reduced by aluminium to metallic titanium directly in acidic or basic cryolite i.e. the direct reduction from Ti(IV) to Ti(0) may occur. However, the ultimate reduction to the metal is preferably carried out in neutral cryolite. Under neutral conditions Ti(IV) needs to be reduced only to Ti(II), which will disproportionate spontaneously in neutral medium according to the following equation:

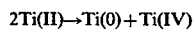

$$2Ti(II) \rightarrow Ti(0) + Ti(IV)$$

Metallic titanium i.e. Ti(0) is produced, and the Ti(IV) regenerated by the disproportionation reaction is available for reduction by aluminium to Ti(II) and subsequent disproportionation. This cyclic process continues until all Ti(IV) is reduced to Ti(0).

Advantageously $Na_2TiF_6$ is added progressively to the cryolite bath in order to minimise loss of volatile $TiF_4$ which might result from thermal decomposition of $Na_2TiF_6$. Sodium fluoride (NaF) may be added with $Na_2TiF_6$ preferably in the ratio 2:1 in order to maintain neutrality of the molten cryolite in accordance with the above equation. Aluminium may be added in a stoichiometric amount or in excess.

It will be appreciated that the process of the present invention may form the basis of a continuous process similar to that used for aluminium smelting. In one approach $Na_2TiF_6$, Al and NaF may be added to the cryolite medium, in which case the product of the reaction is cryolite itself. A mixture of molten cryolite and the suspended metal may then be tapped from the bottom of the reactor. The solid material produced may then be crushed and initial separation of cryolite and titanium metal carried out by any suitable known technique, for example, flotation or cyclone separation. Any cryolite remaining attached to the titanium metal particles may be dissolved away from the titanium metal using any solution based on a metal cation which will complex with fluoride ions, preferably a solution of a water soluble aluminium compound, such as a solution of aluminium nitrate.

Since the process of the present invention is similar to conventional aluminium smelting, an alternative procedure of electrowinning may be used in which $Na_2TiF_6$ and $AlF_3$ are added continuously to a cryolite bath, Ti being deposited at a graphite cathode. Advantageously a sacrificial anode reaction could be utilized. $AlF_3$ would need to be added in the correct stoichiometric amount relative to $Na_2TiF_6$ (4:3) in order to maintain neutrality in the cryolite.

The feedstock for the process of the present invention is preferably $K_2TiF_6$ or $Na_2TiF_6$. It will be understood however that other sources of titanium may be used, such as, $TiF_4$. A major disadvantage of $TiF_4$ is that it reacts readily with atmospheric moisture to form hydrogen fluoride and is difficult and dangerous to handle, whereas $Na_2TiF_6$ and $K_2TiF_6$ are stable in moist air and safe and easy to handle.

We have now developed a process for the safe and easy conversion of $TiF_4$ to $K_2TiF_6$ or $Na_2TiF_6$. In its broadest aspect, this process may be used for the production of intermediates useful in the processing of ilmenite and related minerals.

Further according to the present invention there is provided a process for the production of intermediates useful in the processing of ilmenite and related minerals, characterized in that the process comprises:

a) dissolving a metal fluoride compound in an organic solvent;

b) adding an ammonium fluoride to the metal fluoride compound dissolved in the organic solvent in step a) to precipitate an ammonium fluorometallate from the organic solvent; and c) dissolving the ammonium fluorometallate from step b) in water and adding an alkali fluoride to produce an alkali fluorometallate and an ammonium fluoride.

The related minerals may include, for example, other titaniferous ores such as rutile, titaniferous slags or zircon.

The organic solvent from step b) may be optionally recycled to step a) and the ammonium fluoride from step c) may be optionally recycled to step b).

Preferably the metal fluoride compound in step a) is selected from titanium tetrafluoride, zirconium tetrafluoride and tin tetrafluoride.

The metal fluoride compound in step a) is often contaminated with an impurity such as a metal oxidefluoride, for example, titanium oxidefluoride. As titanium oxidefluoride is insoluble in organic solvents, this impurity can be separated from the titanium fluoride compound by dissolving the mixture in an organic solvent. The metal oxidefluoride impurity remaining as a residue after treatment with the organic solvent can be heated to produce the desired metal fluoride compound and a metal oxide. The metal oxide may then be treated to produce a metal oxide pigment or a refractory ceramic or recycled to produce metal fluoride compounds such as $TiF_4$ or $ZrF_4$.

The organic solvent in step a) is preferably an alcohol, such as, for example, methanol or ethanol.

Preferably the ammonium fluoride in step b) is selected from ammonium fluoride ($NH_4F$) or ammonium bifluoride ($NH_4HF_2$).

The ammonium fluorometallate produced in step b) may be ammonium fluorotitanate, such as, for example, ammonium hexafluorotitanate (($NH_4)_2 TiF_6$ or ammonium fluorozirconate, such as, for example, ammonium heptafluorozirconate (($NH_4)_3ZrF_7$) and ammonium hexafluorozirconate (($NH_4)_2ZrF_6$). Preferably, the ammonium fluorometallate is ammonium hexafluorotitanate (($NH_4)_2TiF_6$) which may be used to produce $K_2TiF_6$ or $Na_2TiF_6$ which is the preferred feedstock employed in the process for the production of metallic titanium described above.

Preferably the alkali fluoride in step c) is potassium fluoride (KF) or sodium fluoride (NaF).

The alkali fluorometallate produced in step c) may be $K_2TiF_6$ or $Na_2TiF_6$ which is the preferred feedstock employed in the process for the production of metallic titanium described above.

In an alternative process, water and optionally base is added to the metal fluoride compound dissolved in the organic solvent in step a) to produce a hydrated metal oxide.

The hydrated metal oxide product from the alternative process may be treated to produce a metal oxide pigment or a refractory ceramic.

In a further alternative process, the ammonium fluorometallate from step b) is pyrohydrolysed to produce a hydrated metal oxide, an ammonium fluoride and hydrogen fluoride.

The ammonium fluoride may be optionally recycled to step b).

The hydrogen fluoride may be optionally treated with silicon dioxide and an alkali fluoride to produce an alkali fluorosilicate. The alkali fluorosilicate may then be heated to produce silicon tetrafluoride and an alkali fluoride. The silicon tetrafluoride may be optionally recycled for use in the process for the formation of $TiF_4$ from minerals such as ilmenite and the subsequent conversion of $TiF_4$ to $TiO_2$ as described in our co-pending Australian Patent Application No. 48186/90.

The further alternative process may be performed using any suitable pyrohydrolysis technique. In a particularly preferred embodiment, a flow system having air with entrained water vapour may be streamed over a bed of the ammonium fluorometallate at temperatures sufficiently low to prevent sublimation of, for example, $TiF_4$ from a fluorotitanate (200°–300° C.) or $ZrF_4$ from a fluorozirconate (450°–500 ° C.). After an appropriate reaction time, typically 4 to 5 hours, the residues are hydrated $TiO_2$ or $ZrO_2$. Volatile HF and $NH_4F$ are carried out of the reaction zone in the air stream and may be condensed to form solid $NH_4F$ and an aqueous solution of HF. The solid $NH_4F$ may be optionally recycled to step b). The HF may be treated with $SiO_2$ and KF or NaF to form $K_2SiF_6$ or $Na_2SiF_6$ which may be recovered and heated to about 600° to 700 ° C. to yield $SiF_4$ which is recycled to a mineral reactor bed to produce further $TiF_4$ and $ZrF_4$ as disclosed in Australian Patent Application No. 48186/90. The KF or NaF residues may be recycled to step c). 100% recovery of $TiO_2$ or $ZrO_2$ and all of the fluoride in the compounds volatilized during pyrohyrolysis has been demonstrated experimentally for pyrohydrolysis of ($NH_4)_2TiF_6$ and ($NH_4)_3ZrF_7$ under such conditions.

The $TiO_2$ and $ZrO_2$ produced by the pyrohydrolysis in the further alternative process are hydrated and therefore more chemically reactive than the $TiO_2$ and $ZrO_2$ obtained from conventional processes. In the conventional processing of ilmenite and related minerals such as zircon, high-temperature oxidation or hydrolysis reactions are used to convert intermediates into titanium dioxide ($TiO_2$) or zirconium dioxide ($ZrO_2$). In the chloride process for pigment-grade $TiO_2$ production, titanium tetrachloride ($TiCl_4$) is burned in oxygen above 1000° C. to produce $TiO_2$. In the conventional production of $ZrO_2$, zircon is fused with alkaline materials at about 1000° C. and then leached with aqueous solution. Sometimes the zircon is pre-heated by plasma techniques to about 2000° C. before leaching. As a result the $TiO_2$ and $ZrO_2$ products obtained in these conventional processes are refractory not particularly amenable to subsequent purification or other processing.

The invention is further described in and illustrated by the following Examples. These Examples are not to be construed as limiting the invention in any way.

EXAMPLE 1

A mixture of about 30g $Na_3AlF_6$ and 1.9 g of $K_2TiF_6$ was melted at 1090° C. in a graphite crucible with a loose-fitting graphite lid. The inert gas argon was bubbled through a graphite lance dipping into the melt. A total of 0.28g of Al and 0.67 g of NaF was added during the reaction by introducing several small compressed pellets of Al and NaF through the lance. After a period of settling, the melt was returned to room temperature and the graphite crucible was sectioned. A black powder was found to have settled towards the bottom of the solidified melt. When this black powder was washed free of cryolite with anhydrous hydrogen fluoride, the powder was shown by electron microprobe analysis to contain metallic titanium. Ignition of the black powder in air produced white titanium dioxide. Aqueous aluminium nitrate solution was shown subsequently to be effective in dissolving the cryolite away from the black powder.

EXAMPLE 2

3.60 g of a commercial, crude sample of $TiF_4$ containing large amounts of titanium oxidefluoride as an impurity, was stirred for several hours in methanol. The resulting solution was separated from the white insoluble residue and added to a saturated solution of $NH_4HF_2$ in 250 ml of methanol. An insoluble white precipitate of $(NH_4)_2TiF_6$ was formed immediately. After filtration, washing with methanol and drying in air, the mass of $(NH_4)_2TiF_6$ was 5.10 g, corresponding with an initial weight of 3.19 g of $TiF_4$ in the crude starting sample.

This example demonstrates the ease of recovery of $(NH_4)_2TiF_6$ from $TiF_4$ and the efficiency of the separation by dissolution in methanol of $TiF_4$ from accompanying oxidefluorides.

EXAMPLE 3

0.318g of $(NH_4)_2TiF_6$ produced as in Example 2 in 5 ml $H_2O$ was added dropwise to a solution of 0.218 g of KF in 1 ml of water, cooled in an ice bath. The gelatinous white precipitate formed was collected by filtration and washed with 5 ml of ice-cold water to remove KF. Drying at 105° C. yielded 0.287 g of anhydrous, pure $K_2TiF_6$. The filtrate was reduced by boiling to one-third of its volume and cooled to 0° C. A second yield of 0.088 g of $K_2TiF_6$ was collected. Overall, the conversion rate of $(NH_4)_2TiF_6$ to $K_2TiF_6$ was 97%. Under process conditions, product recovery could be optimised by using a solution saturated with $K_2TiF_6$ throughout.

EXAMPLE 4

0.1232g of $(NH_4)_2TiF_6$ produced as in Example 2 was pyrohydrolyzed at 200°–250° C. for 5 hours. The weight of hydrated $TiO_2$ after pyrohydrolysis was 0.0524 g, representing a nominal recovery of 105%. When this material was dehydrated by calcining, the weight of $TiO_2$ was 0.0499 g, representing 100.4% recovery, Analysis for total fluoride in the $NH_4HF_2$ sublimate and in the aqueous condensate containing HF indicated 99.3% recovery.

EXAMPLE 5

Three pyrohydrolyses at 450°–500° C. for periods of 4 to 5 hours of $(NH_4)_3ZrF_7$ produced in a similar manner to Example 2 resulted in indicated recoveries of 99%, 101% and 103% for $ZrO_2$ and 99%, 102% and 104% for total fluoride.

We claim:

1. A process for the production of metallic titanium comprising reducing a titanium-fluorine compound selected from titanium tetrafluoride and any hexafluorotitanate soluble in a molten fluoroaluminate, with metallic aluminium in a molten fluoroaluminate.

2. A process as claimed in claim 1, wherein the titanium-fluorine compound is an alkali hexafluorotitanate.

3. A process as claimed in claim 2, wherein the alkali hexafluorotitanate is sodium hexafluorotitanate ($Na_2TiLF_6$) or potassium hexafluorotitanate ($K_2TiF_6$).

4. A process as claimed in claim 1, 2, or 3, wherein the molten fluoroaluminate is a hexafluoroaluminate.

5. A process as claimed in claim 4, wherein the hexafluoroaluminate is cryolite ($Na_3AlF_6$).

6. A process as claimed in claim 4, wherein the hexafluoroaluminate is neutral cryolite ($Na_3AlF_6$).

7. A process as claimed in claim 1, 2, or 3, wherein the alkali fluoride is added so as to preserve the stoichiometry and the neutrality of the molten fluoroaluminate.

* * * * *

UNITED STATES PATENT AND TRADEMARK OFFICE
CERTIFICATE OF CORRECTION

PATENT NO. : 5,397,375
DATED : March 14, 1995
INVENTOR(S) : Thomas A. O'Donnell et al.

It is certified that error appears in the above-indentified patent and that said Letters Patent is hereby corrected as shown below:

On the title page, item [54] and column 1, lines 2-5, change the title to --PROCESS FOR THE PRODUCTION OF METALLIC TITANIUM--.

Signed and Sealed this

Fifth Day of September, 1995

Attest:

BRUCE LEHMAN

Attesting Officer      Commissioner of Patents and Trademarks